United States Patent [19]

Lemaire

[11] Patent Number: 5,941,400
[45] Date of Patent: Aug. 24, 1999

[54] FRAME COLLAPSIBLE AND EXTENDABLE BY MEANS OF A TURNING MOVEMENT

[75] Inventor: Raoul André Lemaire, Rijn, Netherlands

[73] Assignee: Laarhoven Design International B.V., Leiderdorp, Netherlands

[21] Appl. No.: 08/518,015

[22] Filed: Aug. 22, 1995

[30] Foreign Application Priority Data

Aug. 22, 1994 [NL] Netherlands ............................ 9401355

[51] Int. Cl.⁶ .................................................. A47B 43/00
[52] U.S. Cl. ............................. 211/201; 211/167; 248/150
[58] Field of Search .................................. 211/201, 167, 211/195, 199; 108/91, 115; 248/150; 52/645, 646

[56] References Cited

U.S. PATENT DOCUMENTS

| | | | |
|---|---|---|---|
| 494,141 | 3/1893 | Harris | 211/199 |
| 3,261,308 | 7/1966 | Szymber | 108/145 |
| 3,751,863 | 8/1973 | Lyons | 52/645 X |
| 3,967,327 | 7/1976 | Severson | 211/195 X |
| 4,081,177 | 3/1978 | Graff | 256/12 |
| 4,352,327 | 10/1982 | Sleep | 104/170 |
| 4,578,919 | 4/1986 | Amadon et al. | 52/645 |
| 4,746,022 | 5/1988 | Benham | 211/195 |
| 5,131,547 | 7/1992 | Goldberg | 211/201 X |
| 5,149,282 | 9/1992 | Donato et al. | 439/530 |
| 5,163,262 | 11/1992 | Adams | 52/645 X |
| 5,163,569 | 11/1992 | Buff | 211/201 |

FOREIGN PATENT DOCUMENTS

| | | | |
|---|---|---|---|
| 856466 | 11/1970 | Canada | 248/200.1 |
| 0 476 729 | 3/1992 | European Pat. Off. . | |
| 113708 | 3/1918 | United Kingdom . | |

Primary Examiner—Derek J. Berger
Assistant Examiner—Kimberly Wood
Attorney, Agent, or Firm—Griffin, Butler, Whisenhunt & Szipl, LLP

[57] ABSTRACT

A frame collapsible and extendable by means of a turning movement, which frame comprises a number of supporting frames (1) and a number of rod-like upright elements (2, 2'), each upright element being connected to a supporting frame via a pivot (3) for pivoting through at least 90° and being connected to at least one end via a hinge joint (4) and to one end of a further upright element connected to a further supporting frame for swinging and turning about its longitudinal axis, in such a manner that in a first collapsed position the supporting frames form a compact stack with upright elements and in a second extended position the supporting frames are spaced with the upright elements mutually resting on each other surface-to-surface as positioning means, while a spring force in the hinge joint must be overcome to bring the frame out of the extended position.

7 Claims, 3 Drawing Sheets

FRAME COLLAPSIBLE AND EXTENDABLE BY MEANS OF A TURNING MOVEMENT

FIELD OF THE INVENTION

The present invention relates to a frame collapsible and extendable by means of a turning movement, which frame comprises a number of supporting frames and a number of rod-like upright elements, each upright element being connected to a supporting frame via a pivot for pivoting through at least 90° and being connected at at least one end via a hinge joint to one end of a further upright element connected to a further supporting frame, in such a manner that in a first position of the upright elements the frame is in a collapsed position in which the supporting frames form a compact stack with the upright elements, and in a second position the frame is in an extended position in which the supporting frames are spaced with the upright elements as positioning means.

BACKGROUND AND OBJECTS OF THE INVENTION

Such a frame collapsible and extendable by means of a turning movement is known from EP-A-0 476 729. Two successive upright elements are interconnected herein by a hinge joint in the form of a linear joint which, to avoid clearance in the extended position, only permits changes of angle between the upright elements. However, for the upright elements to be able to move between the collapsed and extended positions, they must be able to twist, which is achieved by using a steel U-section. This does not alter the fact, however, that during each collapsing and extending movement not only the upright elements but all the linear joints between the upright elements are subject to twists which, in fact, constitute undesirable tensions and can still lead to clearances which negatively affect the stability. The linear joints must not only be robust but also be secured in the extended position against spontaneous bending back and/or through. To this end, various measures have been taken for both the hinges between two upright elements and the joints between an upright element and a supporting frame. From a structural point of views all this makes the frame relatively complicated and expensive, while the easily twisted upright elements cause the stiffness of the extended frame to be inferior.

Such a frame is particularly meant as a display rack for exhibitions and the like. This relatively weak structure makes an unreliable impression there and is unsuitable for this very reason. Besides, the hinges and the steel U-sections remaining visible results in poor aesthestics, which further adversely affects the serviceableness of the frame.

It is an object of the invention to improve a frame described in the opening paragraph so as to obtain a frame looking relatively stiff and robust in the extended position, while avoiding, during collapsing and extending, twists causing additional wear and not compensated by a displacement.

SUMMARY OF THE INVENTION

This is accomplished according to the invention by providing that at one end located at a hinge joint each upright element comprises a supporting surface and that the supporting surfaces of two upright element ends interconnected via a hinge joint rest on each other surface-to-surface in the extended position of the frame, the hinge joint giving the thus interconnected upright elements an opportunity to both swing from each other in the V-form and to turn about their longitudinal direction, while a spring force in the hinge joint must be overcome to bring the frame out of the extended position. Due to the surface-to-surface contact between the supporting surfaces, in the extended position of the frame a number or successive upright elements, as far as the transmission of force in the longitudinal direction is concerned, will actually form a continuous upright, which is also visually continuous. Moreover, the upright elements can be robust as well, because due to the possibility of turning in the hinge joint the upright elements need no longer twist during collapsing and extending of the frame.

If the supporting surface parts contacting surface-to-surface form a ball joint, the arrest of the upright elements with respect to each other is secured in the extended position by the spring force to be overcome to bring the hinge joint out of the position corresponding to the extended position. Such an arrest can be realized in many known ways, in which connection, e.g., a spring pawl or a V-shaped leaf spring to be compressed may be considered.

A preference is expressed, however, for cooperating supporting surface parts which cannot make a mutual hinge movement shifting surface-to-surface, such as straight supporting surfaces extending perpendicularly to the longitudinal direction of the upright elements. To allow the hinge movement between two upright elements to take place in this situation in the desired manner during collapsing and extending of the frame, it must be provided according to a further embodiment of the invention that each hinge joint gives the thus interconnected upright elements an opportunity to move with respect to each other in the longitudinal direction.

To always ensure, with straight supporting surfaces, an upright continuous in the extended position of the frame, which is preferred from both an aesthetic and a force viewpoint, it may be provided according to a further embodiment of the invention that at a hinge joint the supporting surfaces comprise complementary positioning means.

The three-fold hinge movement, i.e. bending, turning and moving in the longitudinal direction, as well as the arrest of the hinge joint in the extended position can be realized in a surprisingly easy way, if according to a further preferred embodiment of the invention the hinge joint comprises a helical spring the ends of which are attached to the two upright elements interconnected by the hinge joint in such a manner that in the extended position of the frame the helical spring is subject to pre-tension.

In a further embodiment it is preferred that a hinge joint comprises a helical spring and two base elements each consisting of a channel part provided at one end with a supporting surface part having an opening and at its other end with means of attachment for the helical spring, the supporting surface parts being directed towards each other and the helical spring extending under pre-tension in the channel parts between the means of attachment as well as through the aligned openings in the supporting surface parts. Such a hinge can be easily produced in accurate sizes, independently of the upright elements. An easy connection between such a hinge and an upright element, which connection moreover looks very aesthetic, can be obtained, if the channel part of a base element is slid up to its supporting surface part into a hollow section forming part of an upright element and fixed in that position. This embodiment is also possible because the upright elements need no longer twist during collapsing and extending of the frame so that these upright elements, like the supporting frames, may be robust hollow sections.

When used as a display rack, the frame is often faced with panels extending in the circumferential direction and bearing inscriptions. In the known frame these panels were used to increase the stiffness a little by more or less rigidly connecting those panels to the frame. On the one hand, this requires additional measures to obtain that stiffening connection, on the other hand, however, this also meant that relatively labour-intensive activities had to be performed to realize that connection. Especially owing to the latter, the advantage of rapidly and easily collapsing and extending such a frame was substantially lost. Since a frame relatively stiff in the extended position is obtained by the measures according to the invention, facing plates do not need the stiffening function. Thus, it becomes possible according to a further embodiment of the invention that the upright elements comprise magnetic strips extending in the longitudinal direction of the upright elements. Facing plates, likewise comprising magnetic strips, can then be simply and rapidly attached to and removed from the frame.

With reference to an exemplary embodiment shown in the accompanying drawings, the frame according to the invention, which can be collapsed and extended by means of a turning movement, will now be described and explained in more detail.

DETAILED DESCRIPTION

Figure 1:
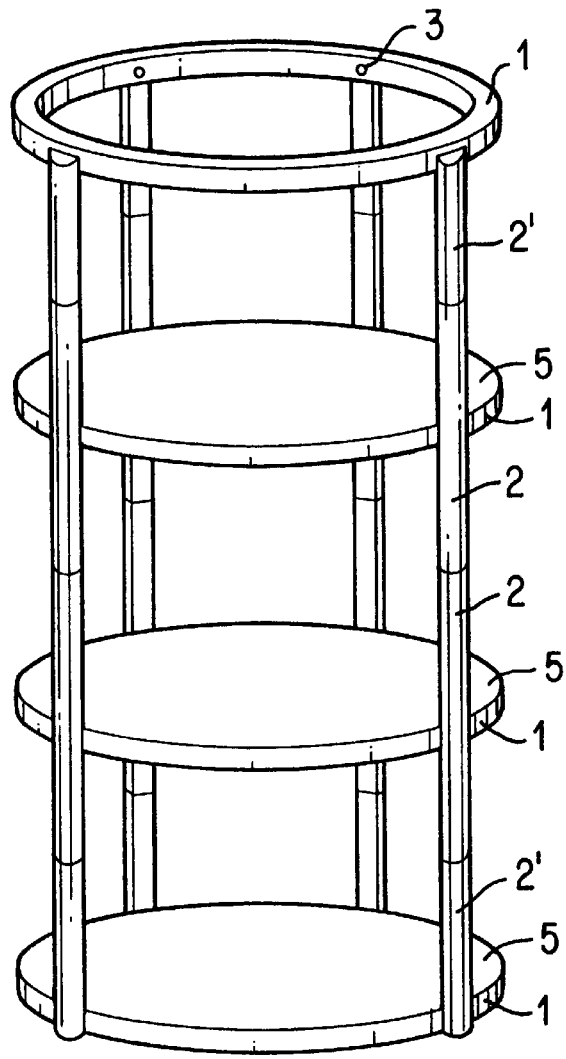
FIG. 1 is a perspective view of a frame according to the invention in the extended position.
Figure 2:
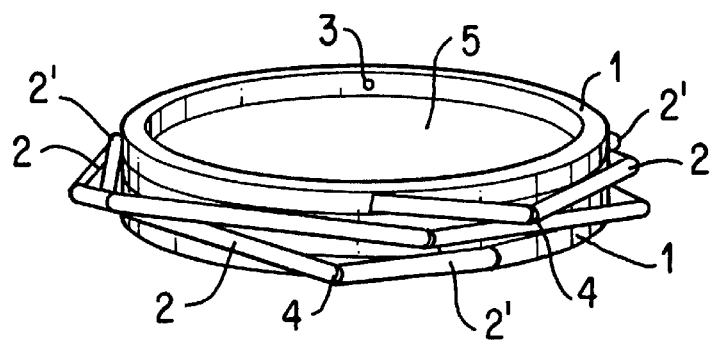
FIG. 2 is the frame according to FIG. 1 in the collapsed position.

The frame shown in FIGS. 1 and 2 comprises four supporting frames 1 and a number of upright elements 2 and 2', which upright elements 2 and 2' are each connected to one of the supporting frames 1 by means of a pivot 3. Both the supporting frames 1 and the upright elements 2 and 2' are made of hollow sections. Each upright element 2' is pivoted at one end to a supporting frame 1, the other end being connected by means of a hinge joint 4 to one end of an upright element 2, which at mid-length is connected to a second supporting frame 1 by means of a pivot 3 and is hingedly connected at its other end to one end of a second upright element 2. In the same manner as the first, this second upright element 2 is pivoted to a third supporting frame 1, and a second upright element 2', which, in turn, is again pivoted at one end to a fourth supporting frame 1. The hinge joints 4 between the upright elements 2 and 2' are, us will be further explained below, of such design that the interconnected upright elements may form a visually continuous upright, four of which are present in the embodiment or the frame shown in FIGS. 1 and 2.

Three of the four supporting frames 1 are provided with a shelf 5, which is omitted at the fourth supporting frame to show the pivots 3, which are not visible from the outer side, because the pivots 3 end in the hollow sections forming the upright elements. In the extended position shown in FIG. 1, the tour supporting frames 1 are spaced by the four uprights directly above each other, so that the extended frame can serve as a display rack.

In order to bring the frame from the extended position shown in FIG. 1 into the collapsed position shown in FIG. 2, it suffices to exert a turning force on one of the supporting frames in the plane of that supporting frame. Thus, the upright elements will bend at their hinge joints 4 with simultaneous turning on their pivots at the supporting frames 1. The movement caused by the above turning force also involves the movement of the supporting frames towards each other, due to the helical bending of the upright elements. This movement can be continued until the four supporting frames lie against each other surface-to-surface and the upright elements extend substantially parallel to the supporting frames, thus attaining the collapsed position shown in FIG. 2.

When two supporting frames are turned with respect to each other, two upright elements interconnected by a hinge joint, which upright elements are each connected to a supporting frame 1 by means of a pivot 3, will have to be able to turn with respect to each other about their longitudinal direction. To obtain relatively stiff uprights in the extended position, these uprights are made of hollow, and therefore stiff, sections. To enable such sections to carry out the desired extending and collapsing movements, it is provided that in addition to a bending movement the hinge joint 4 also allows such a turning movement. Such a double hinging can be realized by means of a ball joint. In its stretched, extended position, an upright composed of a number of upright elements interconnected by ball joints will be able to transmit a relatively high force due to the surface-to-surface contact in the ball joints, but this upright element will also be susceptible to bending at an undesirable moment. This can be avoided by spring-arresting the ball joints in the extended position of the frame. This can be realized by receiving a spring-biased pawl in one part of the ball joint and causing this pawl to engage in the desired arresting position with a complementary recess arranged in the other part of the ball joint. Another method is to cause the point of a V-bent leaf spring to engage with a corresponding recess.

An upright stabler and stronger from a structural point of view is obtained if the contacting surfaces of the upright elements extend in a direction substantially perpendicular to the longitudinal direction of the upright. However, bending of the upright is then only possible if these surfaces can move with respect to each other. This is achieved with the stiff upright elements by giving the hinge joint 4 an opportunity to move in the longitudinal direction of at least one of the upright elements. This can be realized, e.g., by slidably mounting one of the ball joint parts against a spring force in the longitudinal direction of the upright element receiving that part in the direction of the other upright element. A substantially simpler solution for realizing such a hinge joint is shown in FIGS. 3 and 4.

Figure 3:
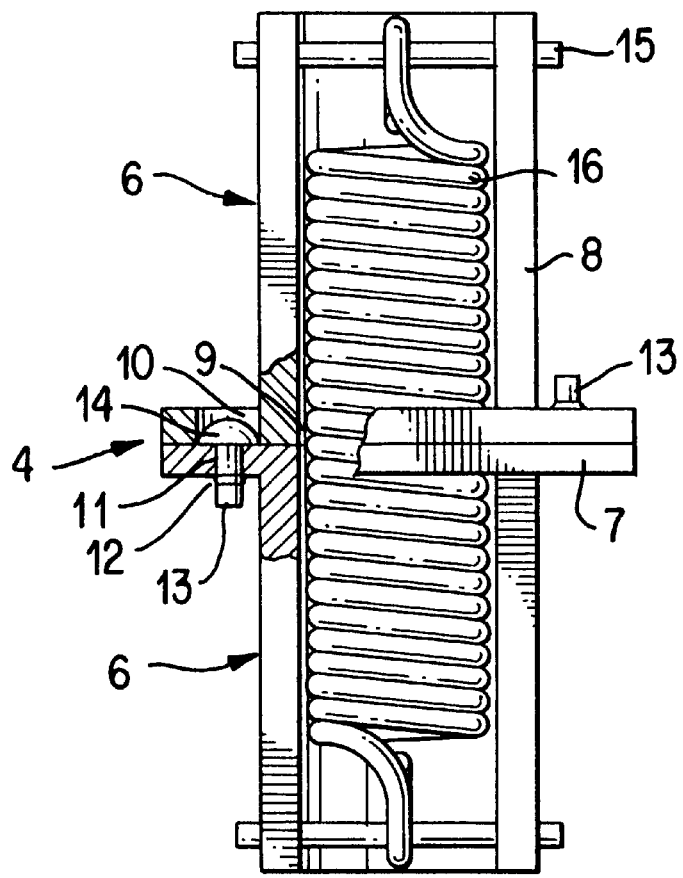
FIG. 3 is a front view, on an enlarged scale, of a hinge for use in the frame shown in FIGS. 1 and 2.
Figure 4:
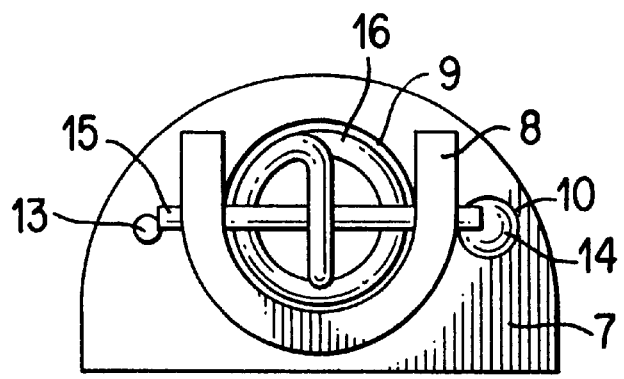
FIG. 4 is a bottom view of the hinge shown in FIG. 3.

The hinge joint 4 shown in FIGS. 3 and 4 is provided with two equal base parts 6, each comprising a supporting surface part 7 and a channel part 8. The supporting surface parts 7 have an outer circumference corresponding to that of an upright element 2 or 2', and the channel parts 8 have an outer circumference engaging with an upright element 2 or 2' in force fits, so that a base part 6 provides, as it were, a shape-fitting cap on a hollow section forming an upright element.

Each supporting surface part 7 is mirror symmetrical and comprises three continuous bores: a relatively large central bore 9, an adjoining bore 10 having a smaller diameter and a bore 11 located opposite the bore 10 on the other side of the bore 9, which bore 11 has an even smaller diameter. The bores 9, 10 and 11 are situated in such a manner that in case of inverted positioning on the supporting surface part 7 of a further mirror symmetrical supporting surface part 7 the central axes of the bores 9 coincide, as well as the central axis of the bore 10 of one supporting surface part 7 with that of the bore 11 of the other supporting surface part 7. In the bore 11 a mushroom-shaped positioning means 12 having a shank 13 and a head 14 is fixed. The diameter of the head 14 corresponds to that of the bore 10.

The channel parts 8 are provided at their ends facing away from the supporting surface part 7 with aligned bores for receiving a pin 15 which serves as a means of attachment for an eye of a helical spring 16. The diameter of the helical spring 16 is such that it can pass through a bore 9, thus being able to extend from one pin 15 to the other pin 15.

The two base parts 6 are placed with their supporting surface parts 7 against each other in such a manner that the head 14 of the positioning means 12 in one supporting surface part 7 extends into the bore 10 of the other supporting surface part 7, while the helical spring 16 extends under pre-tension between the two pins 15, thus holding the two supporting surface parts 7 together under tension.

To form a hinge joint between two upright elements, one upright element is slid over the channel part 8 until it strikes against the supporting surface part 7 of the one base part 6 and is undetachably connected in that position to that base part, e.g. by plastic deformation or by means of a separate means of attachment.

Figure 5:
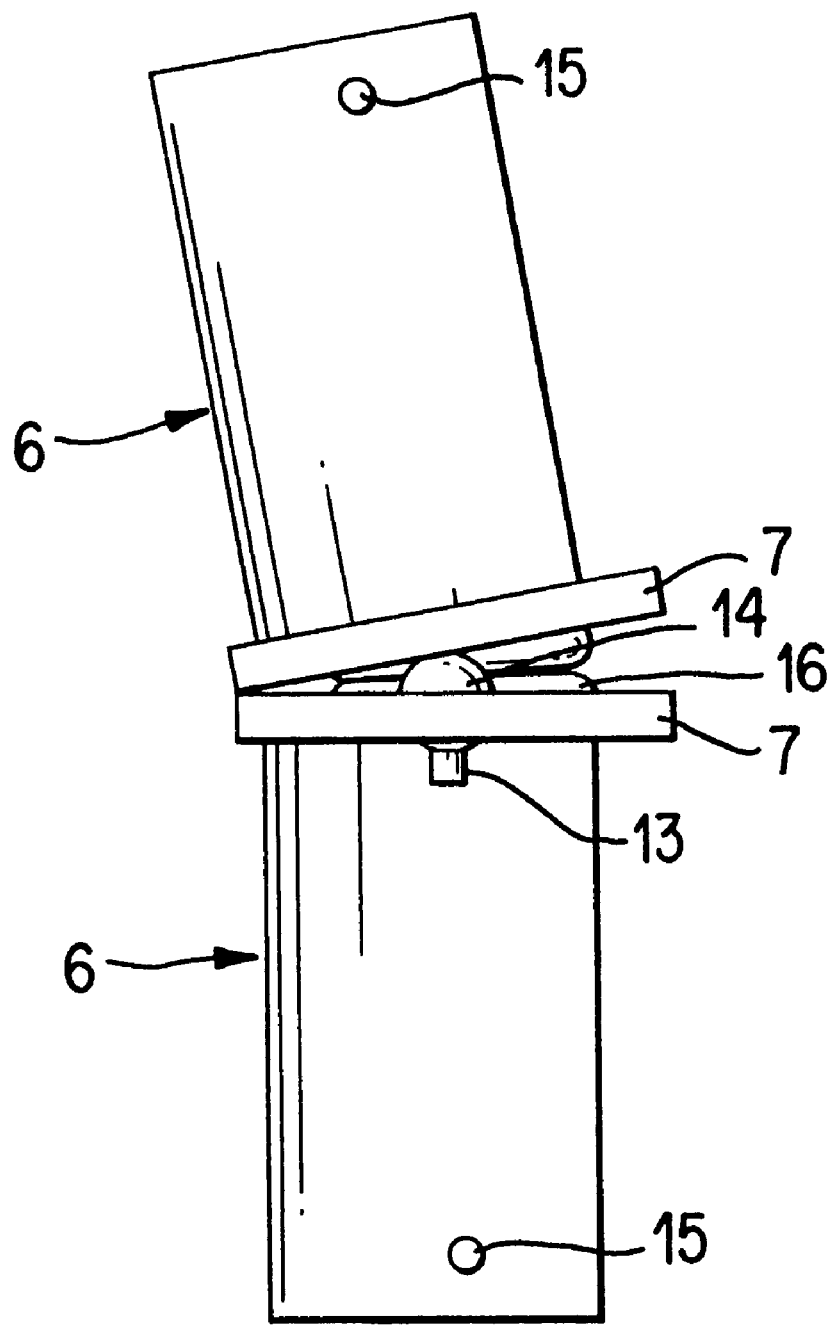
FIG. 5 is a side view of the hinge shown in FIGS. 3 and 4 in a hinged position.

If the upright elements are to hinge with respect to each other, then this may be realized as shown in FIG. 5. Here one base part 6 is brought into a bent V-position with respect to the other, while, in addition, this one base part 6 has moved in the longitudinal direction to enable hinging around the outer edge of the supporting surface parts 7. Since the two base parts 6 are interconnected only by means of the helical spring 16, it will be clear that the one base part 6 can also turn with respect to the other. Thus, the simple hinge joint 4 can perform the three above-mentioned movements without any problems, while, furthermore, in the straight position of the hinge joint 4, as shown in FIG. 3, a very stable abutment is obtained due to the pre-tension in the helical spring 16, which in the extended position of the frame results in the desired relatively stiff upright composed of a number of upright elements 2 and 2'.

In the extended position of the frame, facing plates may be provided, if desired, which, following the circumferential contour of the supporting frames, extend in the space between two or more uprights over the height between two or more supporting frames. To enable such plates to be rapidly and reliably mounted used fixed, magnetic strips are preferably provided on the upright elements 2 and 2'. By likewise providing the plates to be mounted with such magnetic strips, these plates can be rapidly fixed at the desired position by snapping.

It is self-evident that within the scope of the invention as laid down in the following claims many other modifications and variants are possible. Thus, for instance, circular supporting frames are shown in FIGS. 1 and 2; these may also have any other desired form, such as oval or polygonal, provided fitting within the inner circumference of the collapsed upright elements. These upright elements may also have any desired sectional form, hollow or not hollow. Similar form variations are possible with the hinge joints. In these hinge joints the helical spring may also be replaced by another spring element, e.g. a spring-movable leaf spring positioned at at least one end or a means made of resilient plastic material. The positioning means shown may also be modified. Thus, for instance, these positioning means may be formed by ribs and complementary grooves on and in the contacting parts of the supporting surface parts. The frame may further be used in a horizontal position, particularly in case of polygonal supporting frames, in which connection provisions may be made to provide horizontal shelves. Furthermore, several frames may be stacked or otherwise combined to a wall.

What is claimed is:

1. A frame collapsible and extendable by means of a turning movement, which frame comprises a number of supporting frames and a number of rod-like upright elements, each upright element being connected to a supporting frame via a pivot for pivoting through at least 90°, and at least one end of each upright element being connected via a hinge joint to one end of a further upright element connected to a further supporting frame, in such a manner that in a first position of the upright elements the frame is in a collapsed position in which the supporting frames form a compact stack with the upright elements, and in a second position the frame is in an extended position in which the supporting frames are spaced with the upright elements as positioning means, characterized in that at one end located at a hinge joint each upright element comprises a supporting surface and has a hollow cross-section ending in an opening in the supporting surface and that the supporting surfaces of two upright element ends interconnected via a hinge joint rest with aligned hollow cross-sections on each other surface-to-surface and comprise complementary positioning means in an extended position of the frame, the hinge joint giving the thus interconnected upright elements an opportunity to both swing from each other in a V-form and to turn about their longitudinal direction, while a spring force in the hinge joint must be overcome to bring the frame out of the extended position and further characterized in that the hinge joint comprises a helical spring loosely accommodated in the hollow cross-sections and having ends that are locked with respect to the two upright elements interconnected by the hinge joint in a longitudinal direction of said upright elements in such a manner that in the extended position of the frame the helical spring is subject to pre-tension.

2. A collapsible and extendable frame according to claim 1, characterized in that each hinge joint gives the thus interconnected upright elements an opportunity to move with respect to each other in the longitudinal direction.

3. A collapsible and extendable frame according to claim 2, characterized in that each supporting surface is a straight surface extending perpendicularly to the longitudinal direction of the upright element.

4. A collapsible and extendable frame according to claim 1, characterized in that a hinge joint comprises a helical spring and two base elements each consisting of a channel part provided at one end with a supporting surface part having an opening and at its other end with locking means for the helical spring, wherein the supporting surface parts are directed towards each other and the helical spring extends under pretension in the channel parts from the locking means in the one channel part to the locking means in the other channel part as well as through the aligned openings of the two supporting surface parts.

5. A collapsible and extendable frame according to claim 1, characterized in that the supporting frames and the upright elements are substantially formed from hollow sectional material.

6. A collapsible and extendable frame according to claim 4, characterized in that the channel part of a base element is slid up to its supporting surface part into a hollow section forming part of an upright element and fixed in that position.

7. A collapsible and extendable frame according to claim 1, characterized in that the upright elements comprise magnetic strips extending in the longitudinal direction of the upright elements.

* * * * *